(12) United States Patent  (10) Patent No.: US 8,074,394 B2
Lowrey, III  (45) Date of Patent: Dec. 13, 2011

(54) RIFLESCOPE WITH IMAGE STABILIZATION

(76) Inventor: John William Lowrey, III, Mansfield, LA (US)

( * ) Notice: Subject to any disclaimer, the term of this patent is extended or adjusted under 35 U.S.C. 154(b) by 1004 days.

(21) Appl. No.: 11/076,340

(22) Filed: Mar. 8, 2005

(65) Prior Publication Data

US 2006/0201047 A1   Sep. 14, 2006

(51) Int. Cl.
  *F41G 1/38* (2006.01)
(52) U.S. Cl. .......................................................... 42/123
(58) Field of Classification Search ............ 42/135–139, 42/119–123
  See application file for complete search history.

(56) References Cited

U.S. PATENT DOCUMENTS

| | | | | |
|---|---|---|---|---|
| 3,212,420 A | * | 10/1965 | De La Cierva | .................. 396/8 |
| 3,415,157 A | * | 12/1968 | Marchisio et al. | .......... 89/41.06 |
| 3,503,318 A | * | 3/1970 | De La Cierva | .................. 396/55 |
| 3,515,881 A | | 6/1970 | Philbrick et al. | |
| 3,617,016 A | * | 11/1971 | Bolsey | .......................... 244/3.16 |
| 3,659,494 A | | 5/1972 | Philbrick et al. | |
| 3,749,494 A | * | 7/1973 | Hodges | ........................... 356/16 |
| 3,756,687 A | * | 9/1973 | Shin et al. | ...................... 359/557 |
| 3,782,822 A | * | 1/1974 | Spence | ........................... 356/21 |
| 4,152,969 A | * | 5/1979 | Leightner | ..................... 89/41.21 |
| 4,370,914 A | | 2/1983 | Voles | |
| 4,438,765 A | * | 3/1984 | Wilinsky | ........................... 606/4 |
| 4,470,817 A | * | 9/1984 | Diehl et al. | ....................... 434/22 |
| 4,531,052 A | | 7/1985 | Moore | |
| 4,777,352 A | * | 10/1988 | Moore | ........................... 235/404 |
| 4,777,861 A | | 10/1988 | Lecuyer et al. | |
| 4,787,739 A | | 11/1988 | Gregory | |
| 4,936,190 A | * | 6/1990 | Pilcher, II | ..................... 89/41.05 |
| 5,026,158 A | * | 6/1991 | Golubic | .......................... 356/252 |
| 5,107,370 A | | 4/1992 | Dey | |
| 5,127,165 A | | 7/1992 | Polzin et al. | |
| 5,208,418 A | * | 5/1993 | Toth et al. | ..................... 89/41.07 |
| 5,315,435 A | * | 5/1994 | Horiuchi | ........................ 359/554 |
| 5,379,676 A | * | 1/1995 | Profeta et al. | ................ 89/41.05 |
| 5,394,207 A | * | 2/1995 | Fujisaki | ........................... 396/55 |
| 5,633,756 A | * | 5/1997 | Kaneda et al. | ................. 359/554 |
| 5,672,862 A | * | 9/1997 | Ohara et al. | .................... 250/204 |
| 5,715,086 A | * | 2/1998 | Noguchi et al. | ............... 359/557 |
| 5,822,713 A | * | 10/1998 | Profeta | .......................... 701/302 |
| 5,834,677 A | * | 11/1998 | Muller | .......................... 89/41.17 |
| 5,842,054 A | * | 11/1998 | Suzuki et al. | .................... 396/55 |
| 5,966,859 A | | 10/1999 | Samuels | |
| 5,974,940 A | * | 11/1999 | Madni et al. | .................. 89/41.17 |
| 6,247,259 B1 | * | 6/2001 | Tsadka et al. | ................... 42/114 |
| 6,252,706 B1 | | 6/2001 | Kaladgew | |
| 6,269,581 B1 | * | 8/2001 | Groh | .............................. 42/122 |
| 6,560,560 B1 | * | 5/2003 | Tachner | ....................... 702/164 |

(Continued)

*Primary Examiner* — Troy Chambers
(74) *Attorney, Agent, or Firm* — Warner J. Dalaune; Baker Donelson, et al.

(57) ABSTRACT

An image stabilization or vibration reduction facility for a riflescope and firearm has a transparent optical element that refracts incoming rays passing based on motion, to provide a stabilized image, which is transmitted to a user along an optical path of a rifle scope. A feedback transducer connected an output signal from the stabilization facility indicates a characteristic of the output signal. The transducer may be a second reticle that moves based on motion of the riflescope to indicate the degree of deflection by the stabilization facility, and may illuminate when the stabilization facility is in a neutral condition without deflection. The rifle may include a trigger block the prevents trigger operation until a neutral condition is detected. A rangefinder and wind indicator input may be provided, with the stabilization facility refracting the incoming image to compensate for bullet drop at the indicated distance, and for the effects of the indicated wind speed and direction; the riflescope may omit conventional bullet drop and windage adjustment elements.

10 Claims, 3 Drawing Sheets

U.S. PATENT DOCUMENTS

| | | | |
|---|---|---|---|
| 7,171,776 B2 * | 2/2007 | Staley, III | 42/142 |
| 7,269,920 B2 * | 9/2007 | Staley, III | 42/114 |
| 7,284,866 B2 * | 10/2007 | Buchmann | 353/42 |
| 7,421,816 B2 * | 9/2008 | Conescu | 42/122 |
| 2004/0074132 A1 | 4/2004 | Jirina | |
| 2004/0134341 A1 | 7/2004 | Sandoz et al. | |
| 2005/0213962 A1 * | 9/2005 | Gordon | 396/502 |
| 2005/0268521 A1 * | 12/2005 | Cox et al. | 42/130 |
| 2006/0146015 A1 * | 7/2006 | Buchmann | 345/156 |
| 2008/0098640 A1 * | 5/2008 | Sammut et al. | 42/122 |

* cited by examiner

RIFLESCOPE WITH IMAGE STABILIZATION

FIELD OF THE INVENTION

This invention relates to riflescopes for firearms, and more particularly to image stabilization systems.

BACKGROUND OF THE INVENTION

Rifles used for precision long range shooting, whether for military, law enforcement, hunting, or target shooting, often employ high power telescopic sights or riflescopes that provide a magnified image of the target, with crosshairs or another reticle at the same focal distance as the image. Other than the reticle, the riflescope provides a clear optical path that provides the shooter with a much clearer image of the target area than does the naked eye. Such riflescopes are generally elongated and compact compared to the dimensions of the rifle, so that they do not add excessive bulk and weight to the rifle. For longer ranges, higher magnifications are often employed.

A significant limitation of shooting accuracy is presented by unsteadiness of the rifle. Bench-rest competition shooters employ stable platforms for their rifles to remove this source of motion. However, most other shooters must content with imperfect supports for their rifles, with a standing shooter hand-holding a rifle being a relatively unstable condition for example. With accurate rifles capable of accuracies of better than one minute of angle or about one inch per hundred yards, even slight movements of the rifle can lead to inaccuracies far in excess of the capability of the rifle. Even a shift of only 0.01 inch by the muzzle of the rifle can generate such a significant inaccuracy. Moreover, factors such as wind and the shooter's breathing and heartbeat can generate such deviations in aim. In a combat or hunting context, the shooter's physiological responses to stress or excitement can significantly worsen the motion associated with holding an imperfectly-supported rifle.

The motion or shake that causes shooting inaccuracy also presents a visual problem. High-powered riflescopes magnify the motion, blurring the image. This makes it difficult to detect, acquire, and identify targets. A shooter might prefer a higher-powered rifle scope for accuracy, except that the shaky image in actual use makes such magnification impractical.

For weapon systems where optical acuity, bulk, weight, and power consumption do not appear to be concerns, it has been proposed to employ a gyroscopically-stabilized television image as a fire-control sighting system for a weapon on a moving platform to provide a still image. This is described in U.S. Pat. No. 3,659,494 to Philbrick et al. The Philbrick system projects an image of the target on a photodetector, which converts the image into an electronic signal. An electron beam regenerates the image on a phosphor screen that is viewed by the user. The regenerated image is stabilized by a facility that shifts the electron beam based on gyroscopic inputs. While apparently suitable for aiming large weapon systems, it does not appear to be suitable for applications where a high quality image, and small size, low weight, low cost, and simplicity are desired. Moreover, it appears unsuited to adapt to existing rifle scopes.

The Philbrick patent further describes the system applied to a weapon with an electronic trigger system, so that the sighting system itself automatically sends an electronic signal that fires the weapon when the sight is in a neutral or "home" position in which the image is not shifted, unless the user inhibits firing by releasing pressure on a trigger solenoid. Thus, the Philbrick system is further unsuitable for adaptation to convention rifles using mechanical triggers.

SUMMARY OF THE INVENTION

The present invention overcomes the limitations of the prior art by providing an image stabilization or vibration reduction facility for a riflescope and firearm. The facility has a transparent optical element that refracts incoming rays passing based on motion, to provide a stabilized image, which is transmitted to a user along an optical path of a rifle scope. A feedback transducer connected an output signal from the stabilization facility indicates a characteristic of the output signal. The transducer may be a second reticle that moves based on motion of the riflescope to indicate the degree of deflection by the stabilization facility, and may illuminate when the stabilization facility is in a neutral condition without deflection. The rifle may include a trigger block the prevents trigger operation until a neutral condition is detected. A rangefinder and wind indicator input may be provided, with the stabilization facility refracting the incoming image to compensate for bullet drop at the indicated distance, and for the effects of the indicated wind speed and direction; the riflescope may omit conventional bullet drop and windage adjustment elements.

DETAILED DESCRIPTION OF A PREFERRED EMBODIMENT

Figure 1:
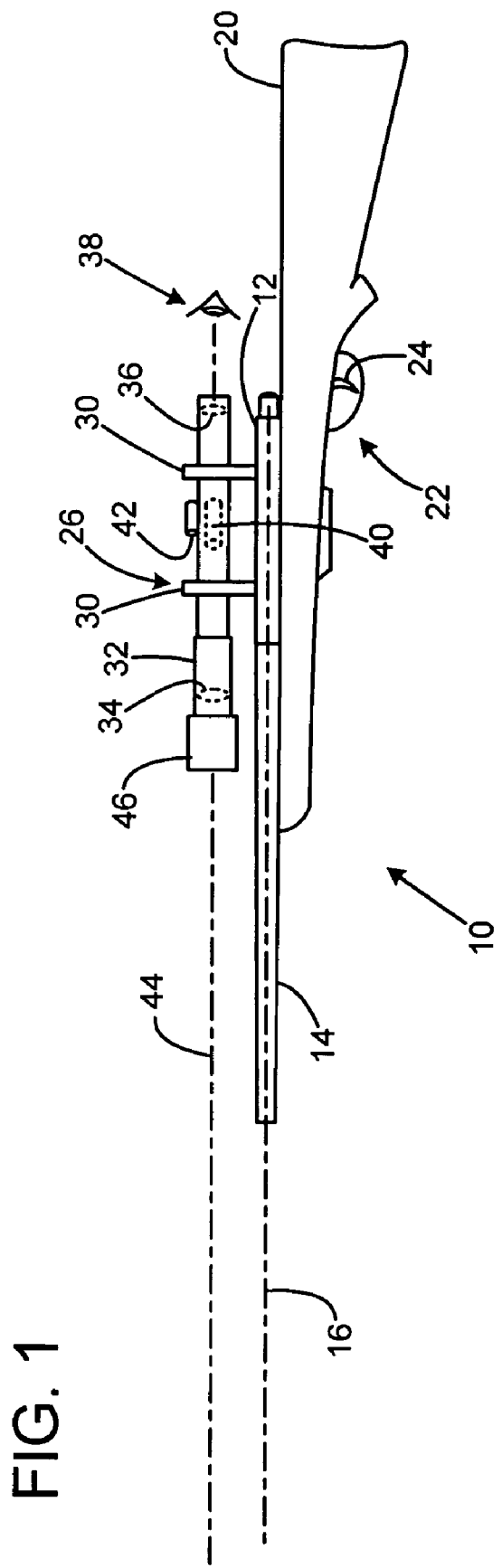
FIG. 1 is a side view of a rifle and riflescope according to a preferred embodiment of the invention.

FIG. 1 shows a rifle 10 with a receiver 12 providing a frame, a barrel 14 connected to the receiver and defining a barrel axis 16. A stock 20 is connected to the receiver and partially encompasses a trigger mechanism 22, leaving exposed a trigger lever 24. A telescopic rifle sight or riflescope 26 is secured to the receiver by way of scope mounts 30. The scope has an elongated tubular housing 32 with an enlarged forward portion housing an objective lens 34, and a rear portion housing an eyepiece lens 36. (All lenses shown in simplified form instead of the preferred multiple element arrangements.) A user 38 views an image of an intended target from the rear of the eyepiece. A prismatic optical element 40 is positioned between the objective and eyepiece lenses, and is shifted vertically and horizontally by adjustment knobs 42 to shift the image to coincide with a bullet's expected point of impact, with adjustments for bullet drop based on distance, and for windage due to cross winds. The scope defines an optical axis 44.

Figure 2A:
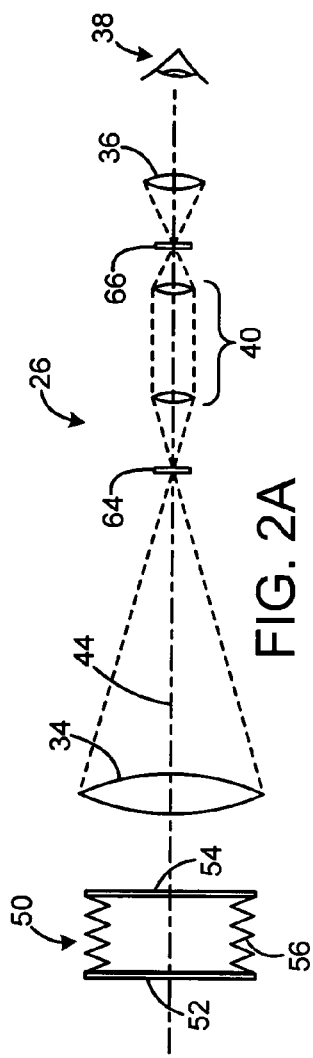
FIGS. 2A, 3A, and 4A are sectional side views of the riflescope of FIG. 1.

At the front end of the scope, forward of the objective lens 34, is positioned a vibration reduction or image stabilization device 46. As shown in FIG. 2A, the device 46 is in the form of a transparent prism 50 with a flat front surface 52 and flat rear surface 54. A liquid-tight bellows 56 connects the transparent plates that provide the front and rear surfaces, and a transparent index-matched fluid fills the volume defines by the plates and bellows. This enables the front and rear surfaces to be angled with respect to each other by the motivation of actuators (not shown) about the periphery of the plates. The prism may provide any of a range of angular offsets between the plates, with the direction of the offset being in any direction. This provides the capability of providing an device for deflecting or refracting a ray of light by any amount up to a maximum deflection angle, in any direction with respect to the optical axis 44 of the scope 26. FIG. 2A shows the prism in the neutral position in which the plates are parallel to each other and perpendicular to the scope axis 44. Both plates may move as shown, or one may be fixed with the other movable. Any alternative image-shifting system may be employed.

The stabilization device operates in response to angular motion of the rifle to which it is fixed, both in the pitch direction (muzzle up and down) and the yaw direction (muzzle right-left). Gyroscopic, inertial, optical or other angular motion sensors operate in each of the two axes to indicate to device circuitry the angular displacement of the device. In response, the prism instantaneously and continuously adjusts the angle and magnitude of shift to generate a beam deflection equal to the angular displacement, based on conventional optical formulae. Such devices are well known in binoculars and video cameras to provide stable images. Typically, the devices are limited to sensing and correcting for only small, rapid angular movements, and not large, slow and sustained movements. In alternative embodiments, any other type of stabilization system may be employed, as long at it is a transparent system that transmits the image without degradation. A lack of image degradation facilitates accurate target detection and identification. Further, a transparent system keeps the image of the target at a long or essentially infinite distance, unlike stabilization systems that project or generate an image on a screen of the device. Accordingly, conventional rifle scopes that are designed for viewing distant images may be employed with such zero-magnification transparent devices.

Because the angular displacements that are of concern to shooters are extremely small (on the order of minutes of arc), the prismatic deviations needed are very small, so that there is no concern with chromatic aberrations degrading the image. Moreover, the vibrations associated with rifles are much longer period than those of compact camcorders and binoculars, owing to the relatively substantial weight and moment of inertia of an elongated rifle. Thus, the stabilization system may be tuned to filter vibrations with a frequency on the order of one second.

Figure 3A:
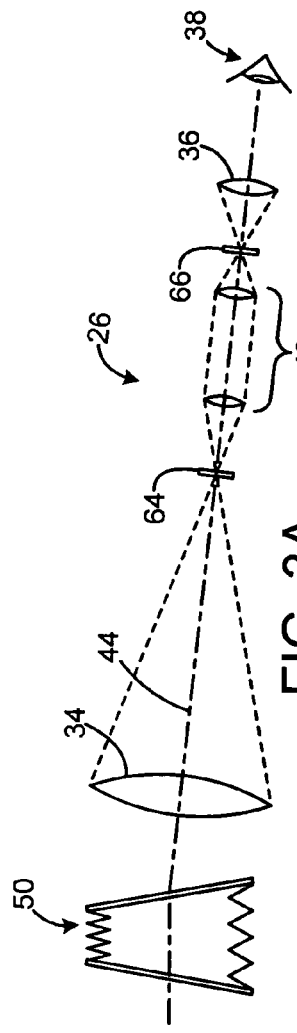
Figure 4A:
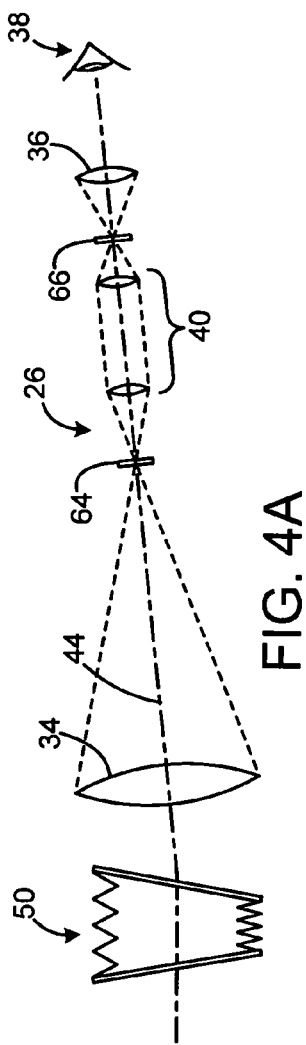
Figure 4B:
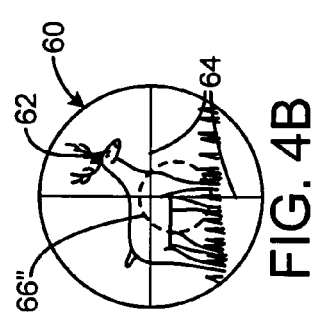

In FIG. 3A, the system is shown in a condition in which the rifle is in an elevated condition with the muzzle momentarily elevated unintentionally due to the unsteadiness of the shooter. In FIG. 4B, the rifle is in a depressed elevation. The angle is greatly exaggerated for clarity, with the actual angle being less than one degree, compared to the illustrated angle of about ten degrees. The prism is flexed (illustrated with exaggerated flexure) to take the horizontal incoming ray, and deflect it to continue down the optical axis of the scope. This may also be thought of as taking the target aiming point as perceived by the user, and shifting the prism as the rifle moves to keep the same target point at the same position in the field of view. While this occurs, the rifle bore and actual point of impact shift with the unsteady rifle, even though the image appears steady.

Figure 2B:
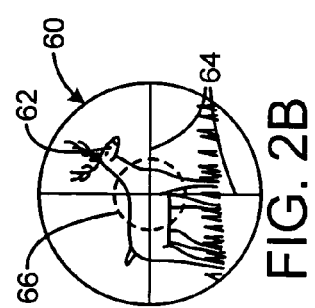
FIGS. 2B, 3B, and 4B are viewfinder images of a the riflescope of FIG. 1.

Feedback is provided to the user about the degree of shaky deviation from the nominal point of aim. FIG. 2B shows the field of view 60 seen by the user. A target 62 is seen, and a first reticle shown as crosshairs 64 that remain fixed in the field of view. The image may be shifted in the field of view in a conventional manner using the knobs 42 to zero and calibrate the scope, and to adjust for elevation and windage based on distance and wind. This shift is independent of the stabilizing shift generated by the prism. In FIG. 2B, the prism is in the neutral position corresponding to FIG. 2A. The intersection of the cross hairs of the first reticle 64 reflects the actual point of impact (assuming a zeroed scope with properly adjusted knobs for the target distance.)

Figure 3B:
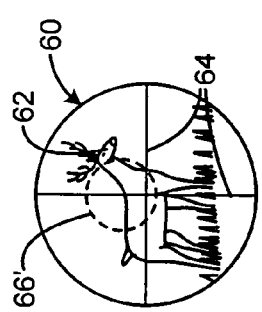

A second reticle 66 in the form of a circle is centered on the first reticle. The second reticle indicates the actual point of aim, and moves as the rifle shakes. The second reticle's movement is in a direction, magnitude, and velocity to correspond to the rifle shake. In FIG. 3B, the upward deviation of the rifle is illustrated by the second reticle circle 66' being shifted upward out of alignment with the first reticle, and in FIG. 4B, the downward deviation of the rifle is illustrated by the second reticle circle 66' being shifted downward out of alignment with the first reticle. The second reticle may shift in any lateral or angular direction based on angular rifle motion in any direction, not just the vertical deviations shown for simplicity.

The neutral condition shown in FIG. 2B is further indicated by the second reticle 66 being illuminated. The neutral condition is defined as device deflection angles less than a selected threshold. This threshold may vary depending on the application, and may be varied by user by an input device (not shown) that connects to control circuitry. For maximum accuracy under stable and controlled conditions, the tolerated deviation may be a minute of arc. For closer range hunting in unstable conditions, a much wider range of deviation may be tolerated and still be considered adequately "on target" and thus in the neutral condition to generate the visible feedback. The threshold may be programmed upon manufacturing for a particular application, or may be settable by reprogramming or an input such as a dial or knob in the field by the user. Alternatively, the reticle may be located within the image shifting prism system, so that motion of the prism inheretly adjusts the apparent location of the reticle.

Feedback is also provided in the form of a trigger block mechanism to be discussed below in the context of the alternative embodiment. Such a mechanism serves to prevent discharge of the firearm except when the sight accurately reflects the point of impact on the target, so that a user is not deceived by the first reticle being on target when the rifle is shaking off target. A user may apply pressure to the trigger, but it has no effect until the moment that the system indicates a neutral condition, in which case the trigger block releases to allow trigger movement.

To provide feedback, the circuitry that calls upon the prism to shift has an output that transmits a signal, or which is switched to a voltage potential, when the prism deviation is less than the preselected threshold. This enables the user to overcome inherent instabilities without needing to time a shot by anticipating a moment of alignment, which risks jerking the trigger and misaligning the rifle from the target before the bullet exits the muzzle. For instance, a shooter in a stable prone position may still experience a cyclic motion of the point of aim due to breathing. Even with breath control and holding one's breath when taking the shot, heartbeats can cause a cyclical motion. As the user observes the cyclic motion, typically a diagonal or elliptical path of the point of aim, the stabilization system maintains a steady field, and the shooter readily holds the first reticle's crosshairs on the desired target point (which appears steady.) The cyclic or other motion is indicated to the user by the motion of the second reticle, which may follow the diagonal or elliptical path. The shooter ensures that the path crosses through the neutral point, so that the circle coincides with the cross hairs periodically, and the second reticle illuminates regularly.

When such a cycle is established, the shooter may apply pressure to the trigger, and the rifle will discharge when the next neutral condition occurs. This provides for enhanced accuracy, because the shooter does not know when the discharge will occur. Being surprised by the exact moment of discharge prevents and makes impossible the flinching that causes many shots to miss.

A shooter in very unsteady conditions may find that it is difficult to get regular indications of a neutral condition. In such instances, the shooter may adjust the threshold of accuracy, or find a more stable position or support to make shooting more accurate. Thus, the system prevents shots that may be dangerous to bystanders (in the case of a police marksman) or inhumane to game.

The second reticle movement is provided by a transparent LCD display with a multitude of pixels, so that the circle may be displayed in any location in the field of view. In alternative embodiments, the reticle may be moved by actual motion of the reticle or of an optical element that projects the reticle into the field of view. As shown in FIG. 2A, the first reticle 64 is positioned in the first focal plane of the rifle scope. This is the position at which the objective lens focuses the nearly parallel rays from the image of the distant target. Thus, the reticle 64 appears sharp when the image appears sharp. The element 40 refocuses the rays to the second focal plane, where the second reticle 66 is positioned. This is the focal point of the eyepiece 36, which transmits a sharp image of both reticles and the image to the user 38. In alternative embodiments, the reticles may be switched to occupy the opposite focal planes, or a single reticle having the force cross hairs, and an LCD or other means for displaying a moving circle may occupy a common focal plane.

Figure 5:
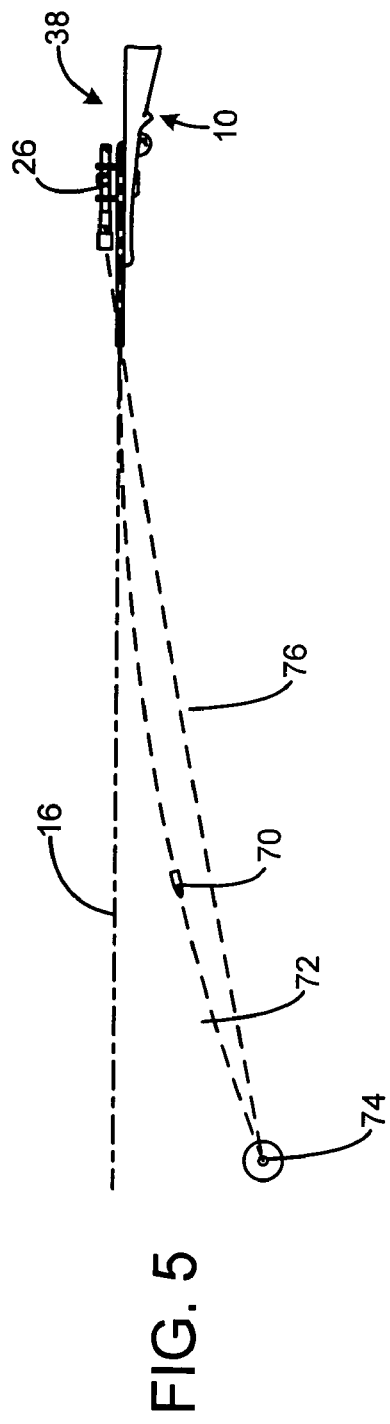
FIG. 5 is a side view of the operation of a system according to an alternative embodiment of the invention.

FIG. 5 shows the effects of bullet drop with respect to the rifle 10. The bore axis 16 extends straight from the muzzle of the barrel. In practice, the effects of gravity cause the bullet 70 to drop as it follows the bullet path 72 on approach to the target 74. To provide for accurate aim, the line of sight 76 of the riflescope 26 must be angled downward with respect to the bore axis. This downward angle is different from the slight shift provided by the prism 50 to avoid shake as discussed above, because the downward angle must be sustained. In conventional scopes, this is achieved by adjustment of the lens or prism element 40 using calibrated knobs that are marked with distance (for a given standard ammunition round) or simply the angular deviation in arc-minutes. Such deviations may be on the order of 100 arc minutes for long distance shooting, and thus are about an order of magnitude or more greater than the deviations caused by unsteadiness.

Figure 6:
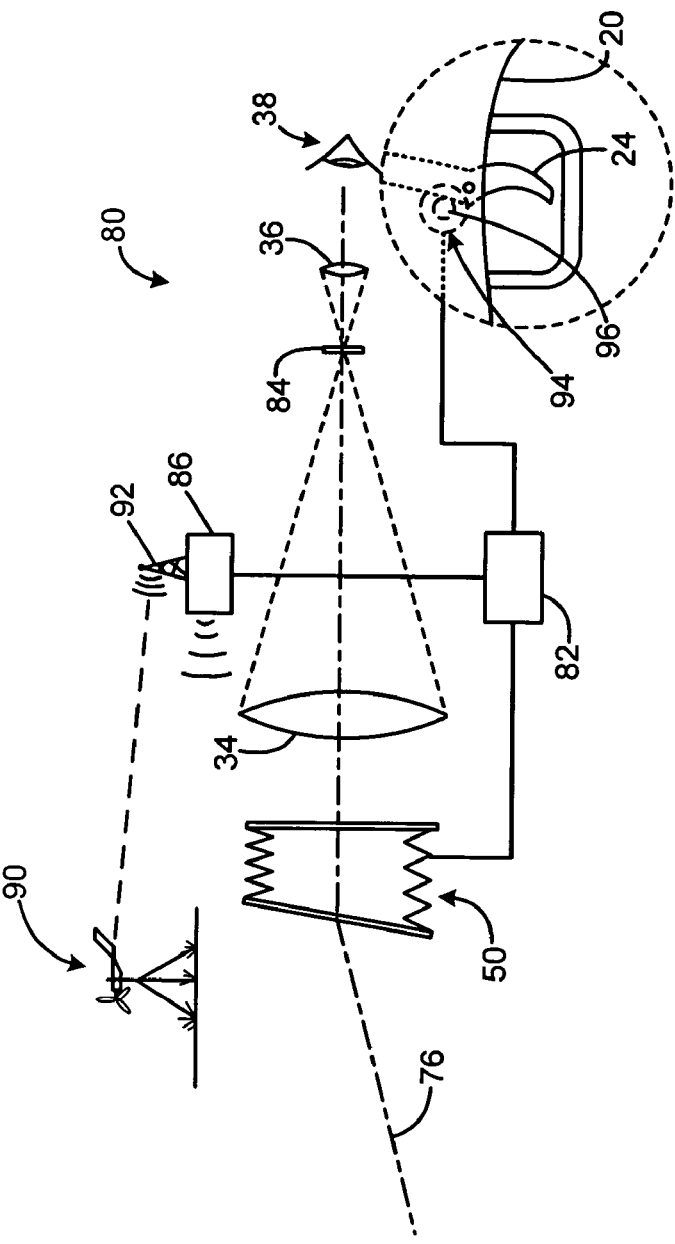
FIG. 6 is a sectional side view of the system of FIG. 5.

In the alternative embodiment shown in FIG. 6, a riflescope aiming system 80 employs the same prism 50, which is connected to control circuitry 82 and positioned forward of the objective lens 34, which is on axis with the eyepiece lens 36. In this embodiment, the element 40 is absent, as are the knobs that adjust it. A single focal plane is provided for a single reticle 84, which is at the common focal point of the objective and eyepiece. All adjustments for windage and elevation are made by the prism 50, which is the only moveable element in the system (other than focusing or collimation adjustments used on any telescope without firearm functionality. These adjustments may be made even if the prism were not employed for shake reduction, and though both features are preferably usefully combined. In a simple case, input knobs (not shown) may be provided for the user to input the target distance or elevation adjustment, as well as any windage correction. However, in the preferred embodiment, either or both of these are established by electronic means.

A rangefinder 86 is connected to the circuitry 82, and determines the distance to the target, and transmits range data to the circuitry, so that the expected bullet drop can be calculated. Based on this bullet drop, the prism shifts by the appropriate amount. Similarly, and optional windage adjustment may be provided by entering wind speed or direction, or employing a remote anemometer 90 that transmits via radio reduce or other means the wind direction and speed. The wind information is received by a radio receiver 92 on the scope, and is electrically connected to the circuitry. The circuitry may have substantial computing power, so that multiple anemometers may be used for more precision.

For more precise calibration, or to adjust to non-standard ammunition or powder loads, the system may be calibrated by shooting at a variety of known distances. At each distance, the user may indicate the deviation from the system's expected target point by inputting to the system the targeted point, and also the actual point of impact, so that the system can detect the difference in angle between the two points, and compensate. This may be done by aligning one reticle with the intended point of aim, and adjusting the other reticle to the actual point of impact. With several distances established, the system's computer circuitry may interpolate a more accurate bullet path for all distances. The system may interface with a separate computer where extensive user input is required, and to avoid an excessively complicated or bulky interface on the scope, and the system and computer may communicate by cable or any wireless means.

In addition, the unit may receive or be entered with more general information about prevailing winds, which would provide less useful information, but would be useful in battlefield conditions where troops are unable to readily ascertain wind information. An advanced system may employ an external system such as airborne doppler radar to more precisely map wind patterns in real time, and to provide downloadable information to a soldier whose system provides a GPS location to upload to the radar system to gain local wind information, including wind patterns between him and the intended target. The system may also employ an elevation transducer that provides information to the circuitry about the angle of elevation or depression of the barrel, so that the image may be shifted to compensate for the effects of shooting at such angles.

FIG. 6 shows in detail a trigger block system that is employed in either illustrated embodiment. A solenoid 94 having a piston 96 is electronically connected to the control circuitry 82 (which is employed by all embodiments.) Normally, the cylinder is extended to block the path of the trigger lever 24 to prevent firing. When the system is in the neutral position, the circuitry applies a voltage, and the piston retracts. Depending on intended usage, when power is lost, the solenoid may be selected to default to the safe position (such as for a hunting rifle) or the enabling position (such as for military use). The trigger block is designed for low friction interaction with the trigger lever (preferably by a trip mechanism employed in triggers and not the sliding piston shown) so that pressure on the trigger lever by a ready shooter does not inhibit retraction of the piston. This enables the shooter to employ the "squeeze when ready" technique, and await the moment of discharge while keeping the crosshairs (or whatever pattern desired for the first reticle) on the target point. In an alternative embodiment, the trigger block may interact with any suitable element in the trigger mechanism to inhibit and permit firing.

In alternative embodiments, firearms employing electronic triggers and using ammunition with electrically activated primers may use the same system, but with the neutral signal enabling the electronic means of firing. For instance, the stabilization system may be added to a riflescope to the rear of the eyepiece, in which case the scope crosshairs would move with rifle and prism movement, and the second reticle would remain stationary. In addition, the system may be employed in conjunction with any aimed weapon, including handguns, bowed weapons, beam weapons, and any military projectile-expelling weapon.

This disclosure is made in terms or preferred and alternative embodiments, and is not intended to be so limited. For instance, the several different features and alternatives may be implemented individually, or any of a wide range of combinations. Some of these options are discussed below.

The image stabilization technology discussed above with respect to the preferred embodiment may be substituted for by other optics, magnetic stabilization or mechanical isolation of the optics from the housing and still work. The system may be integrated in new product designes, or retrofitted to existing scopes and rifles. The feedback transducer reticle may be a painted or etched a circle, crosshairs or other reticle design on a flat glass ahead of the stabilizing system in add-on configurations on the front of the scope or to the rear of the stabilizing system in add-on configurations to the rear of the scope. The trigger block can receive the signal by wire or wireless (using the keyless systems from the car industry or similar systems). For versions incorporating bullet drop and windage correction, the operation of the stabilizing system never changes. Instead, the location of the neutral or zero correction point is changed in the sensing system so that the signal is sent when the elevation is such that bullet drop is compensated for.

The preferred embodiment shows and describes an internal trigger block. For many applications, it will instead be desirable to have an add-on external trigger block that requires no modification of the firearm, just as an add-on stabilizer requires no modification of the telescopic sight. The blocking mechanism would attach to the bottom of the trigger guard behind the trigger. It would be installed to touch the back of the trigger lever and secured with set screws (or other means). It would prevent the trigger from traveling backwards until the zero adjustment signal is receiver at which time it releases. Pressure is applied the trigger by the shooter when his sight pattern is the way he wants it. He moves the weapon to align the moving reticle with the stabilized one and when he accomplishes this the signal is given, the block releases and the weapon fires. A second part of the block remains in front of the trigger and resets the block when the trigger is released and returned to "ready" position. With an external block system there would be no need for adjustment for different firing systems.

All reticle adjustment directions are given as examples, and may be reversed depending on common practices and simplicity.

An exemplary stabilizing system would be the Canon Vari-Angle Prism system packaged with controller and battery in a short, wide tubular barrel with front and rear non-magnifying lens. An additional circuit would detect the instances in which there is no correction by the stabilizing optics and be capable of sending out an electrical signal. A battery condition indicator and an on/off switch would complete the standard package.

This package would attach to the front of the barrel of the telescopic sight. The attachment would use an adapter selected to fit the type of attachment (front or rear) and the size of the front of the telescopic sight. The front of the adapters will accept the standard screw-in component of the stabilizing package.

One type of adapter would slip over the barrel and be moved rearward until the rear non-magnifying lens was in contact with the front lens of the sight. It would then be tightened at the rear with a long section that would hold the alignment of the stabilizer and sight. Another type of attachment would unscrew the front shading lens and replace it with a screw-in adapter chosen to fit the barrel. An internal receptor will allow the shading lens to be reattached inside the barrel of the stabilizer if that is desirable.

A reticle (circle, crosshairs, dot, or other design) would be etched in front of the stabilizing optics to provide the feedback of the weapon position in relation to the stabilized image. This reticle would be lighted from below with a small bulb that would shine when the "zero correction" signal is received.

Another version would incorporate a range finder (optical or laser) in the stabilizer package. The optical range finder would be connected to the stabilizer controller to communicate the range. The communication of the range would cause the controller to send a "zero correction" signal at a higher aiming point than the neutral point to compensate for bullet drop at that range. The feedback reticle would be adjusted down to indicate that new "zero correction" signal position. This would require the shooter to raise his weapon to bring the feedback reticle in line with cross-hairs and consequently compensate for the bullet drop at the range shown by the range finder.

A calibration of this range input to the controller would cause the range detected to move the signal point to the appropriate setting that offsets the bullet drop. It would be done in a "calibration mode". In this mode, a target is set up at a normal range for the usage expected. The target is acquired with the stabilizer in operation. The range is detected by the range finder; the bullet is fired and the bullet drop at this distance from the target is noted. The calibration knob (or other method such as ring, button, etc.) is operated to lower the feedback indicator circle so that the center of the circle is even with the bullet strike. Now the range is known and the amount of bullet drop at that range is known. The ratio of these two inputs is true at all other ranges and unique to that weapon/ammunition combination. Each time the range is detected by the range finder the ratio is used to determine the change in the position of the "zero adjustment" signal that will just allow for that bullet drop.

As a practical matter the calibration of the bullet drop adjustment would work best with more than a neutral setting of the telescopic sight range. This feature could be used in conjunction with different telescopic sight settings. By having a selector on the stabilizer the weapon could be calibrated at 100 yds, 400 yds and 600 yds, for example, and the range selected in the field would have exact range settings through the disclosed system. Each ratio used to adjust for bullet drop would correct at the telescopic sight setting for exact point of impact information. In the prior art, with high magnification, the movement of the sight reticle from shooter body instability was greater than the gross adjustment of the range. Now with stabilized optics, the precise adjustment of range is useful, and the disclosed system delivers it.

The amount of bullet drop for a particular weapon/ammo combination is due to the force of gravity and factors of velocity and bullet drag. The windage used in sighting is an adjustment for the force of the wind. Once the ratio of range/bullet drop for one force (gravity) is known, the ratio of bullet deflection for another force (wind) can be automatically adjusted for. The force of gravity was allowed for by a ratio of bullet drop distance to range distance. All needed now is to detect the force of the wind vector that is perpendicular (other vectors are not important) to the line of sight. By applying a constant relating wind force amount to gravity force the adjustment for wind is available.

A tube (or tubes), perpendicular to the axis of the sight, which detects the direction and velocity of the crosswind vector provides the information needed for an indicator for manual adjustment or automatic adjustment based on the range and weapon/ammo combination. A single tube with a two way turbine that detects speed and direction fill this requirement. Another, simpler, design would consist of two opposite facing venturis with pressure detectors.

Gravity is the same all the way to the target but wind is not necessarily the same all the way to the target. This information could be displayed as an indication to be used as the basis of manual windage adjustment. The shooter selects windage adjustment with that indication as his basis and his estimates of wind differences between him and the target (e.g. shooting across a valley). His adjustment can be made in the stabilizer package or in the windage adjustment on the telescopic sight.

This package that attaches to the front of the rifle scope may be a stand alone product with several additional attributes available. The "zero correction" signal in the basic single component package is visual. The main advantages are the additional visual details available with the stabilized image and a more accurate shot.

Hyper accuracy at high magnification or with unstable platforms (e.g. pistols or archery versions) is available to the shooter with the trigger block mechanism added for these additional applications.

For the add-on system, a small, low power, high frequency, radio transmitter that transmits an encoded signal when the "zero correction" situation is detected is added to the device that attaches to the front of the telescopic sight. A small battery-powered receiver, tuned to this encoded signal, is packaged with a simple release mechanism that is coupled to a trigger block device. That device is attached to the trigger guard with the "blocking tang" behind the trigger. It slides forward along the guard until it contacts the trigger. When contact is made the trigger block is fastened in place. The trigger is now blocked from operation until two things happen: the shooter applies pressure on the trigger and the encoded signal indicating "zero correction" condition is received by the blocking mechanism.

The shooter applies pressure on the trigger when the sight picture is as he wants it and moves the weapon so the feedback reticle and the telescopic sight reticle coincide. This situation causes the transmitter to broadcast an encoded signal (similar to the system in an automobile keyless entry system). The encoded signal prevents different systems from interacting in the same way a keyless entry system only opens its door and not all those within range. When the encoded signal is received by the trigger block mechanism the block is released and the pressure by the shooter fires the weapon. Since the shooter does not know when the release is coming there is no trigger jerk and accuracy is even higher than with the single add-on component. There is only a receiver and a release mechanism so its power requirement is low.

Besides the trigger block tang that sticks up from the trigger guard behind the trigger there is another tang that is lying flat against the trigger guard in front of the trigger. When the trigger mechanism is released and the blocking tang is pushed to lie flat against the trigger guard under the engaged trigger the reset tang is moved perpendicular to the trigger guard in front of the trigger (now at the rear). This "reset tang" engages the trigger as it returns to firing position and resets the blocking mechanism. Now the reset tang is lying along the guard and the block tang is locked against the rear of the trigger, ready for another target.

One very useful application of the system would be the addition of the stabilizing package to an archery mechanical string pull device. A low power sight with stabilizing, ranging and windage capabilities would have an even greater impact on the accuracy in archery. The effects of the two forces (gravity and wind) are even greater on an arrow than on a bullet. The trigger release could be wired to directly receive the "zero correction" signal to release the mechanical string pull's trigger.

This arrangement also allows the sight to be positioned with the eyepiece at the shooters aiming eye, also improving accuracy. Optics can connect the eye with the arrow line of sight even though the line is sight is inches below the eyepiece level. Ranging, windage, jerk-free release and comfortable sight position would provide significant advantages for an archery application. Similar advantages can be achieved with scoped pistols.

The invention claimed is:

1. An image stabilization facility for a riflescope comprising:
   a frame;
   a sensor operable to detect motion of the frame;
   circuitry connected to the sensor to generate an output signal based on input from the sensor;
   a transparent optical element in the form of a prism having inputs connected to the circuitry, and operable to refract rays passing through the elements in a direction and by a deflection angle based on the output signal; and
   a feedback transducer connected to the output signal and operable to indicate a characteristic of the output signal, wherein the feedback transducer is a reticle in a connected riflescope, wherein the reticle provides a visual signal when the output signal indicates a neutral condition when the deflection angle is less than a preselected minimal threshold, and wherein the visual signal includes momentary illumination of the reticle.

2. The facility of claim 1 where the riflescope has a first reticle associated with an optical axis of the riflescope, and a second reticle that appears to move with respect to the first reticle based on the direction and deflection angle of the optical element.

3. The facility of claim 1 wherein the feedback transducer is a firing block operable to prevent firing of a firearm on which the riflescope is mounted.

4. The facility of claim 3 wherein the firing block has a blocked position and an enabled position, and operates to shift to the enabled position only when the output signal indicates a neutral condition when the deflection angle is less than a preselected minimal threshold.

5. The facility of claim 1 wherein the optical element operates in response to movement of the frame to generate a stabilized image.

6. The facility of claim 1 including an input responsive to vertically deflect transmitted rays by an amount based on an estimated bullet drop.

7. The facility of claim 6 including a rangefinder connected to the input and operable to generate an estimated target distance.

8. The facility of claim 1 including an input responsive to horizontally deflect transmitted rays by a windage correction amount based at least in part on an input from a wind sensor.

9. The facility of claim 1 wherein the image stabilization facility operates in response both to motion, and to an estimated deviation of a fired bullet from a line defined by an axis of a rifle bore on which the riflescope is mounted.

10. The facility of claim 1 including a firearm with a trigger assembly, the image stabilizer having an output operable to generate a neutral signal when the refraction is by an angle less than a preselected minimal threshold, a trigger block facility responsive to the neutral signal to enable operation of the trigger when the neutral signal is received, and to disable operation of the trigger in the absence of the neutral signal.

* * * * *